United States Patent [19]
Silcock

[11] 4,173,805
[45] Nov. 13, 1979

[54] BRUSHES

[76] Inventor: Gordon H. Silcock, P.O. Box 26099, Auckland, New Zealand

[21] Appl. No.: 693,977

[22] Filed: Jun. 8, 1976

[51] Int. Cl.² .............................................. B60S 3/04
[52] U.S. Cl. .................................. 15/97 B; 15/DIG. 2
[58] Field of Search ........................... 15/97 B, DIG. 2

[56] References Cited

U.S. PATENT DOCUMENTS

| | | | |
|---|---|---|---|
| 3,499,180 | 3/1970 | Hurwitz | 15/97 B |
| 3,517,405 | 6/1970 | Hanna et al. | 15/97 B |
| 3,711,883 | 1/1973 | Ennis | 15/97 B |
| 3,765,043 | 10/1973 | Lesser | 15/97 |
| 3,859,686 | 1/1975 | Breish | 15/97 B |

Primary Examiner—Edward L. Roberts
Attorney, Agent, or Firm—Holman & Stern

[57] ABSTRACT

A brush comprises a frame, able to move in a substantially horizontal plane. A driving device is provided to cause the frame to oscillate in the horizontal plane. From the frame hangs a number of flexible straps which wipe over the vehicle and effect a cleaning action.

5 Claims, 1 Drawing Figure

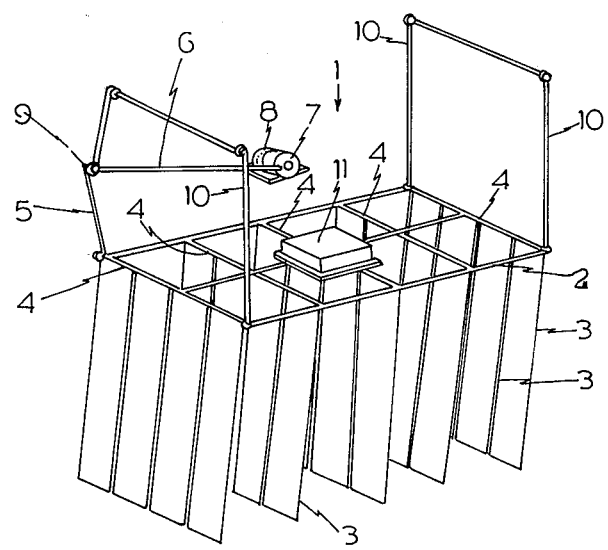

BRUSHES

This invention relates to brushes and has been devised particularly though not solely for use as a brush for a car washing device.

In vehicle washing systems such as car washing systems difficulties have been met in cleansing the top surfaces of the vehicle for example the roof of the car. Brushes adapted to rotate about a horizontal axis have been proposed but those require complicated machinery and tracks to run in to enable the varying heights and contours of vehicles to be coped with by the brush. This is of course disadvantageous.

It is therefore an object of the present invention to provide a brush which obviate or minimise the foregoing disadvantages in a simple yet effective manner or which will at least provide the public with a useful choice.

Accordingly the invention consists in a brush comprising a frame member, a plurality of flexible straps fixed to said frame member adapted to hang a substantially vertical direction from said frame member and oscillatory means adapted to move said frame member in an oscillatory motion in a substantially horizontal plane.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

One preferred form of the invention will now be described with reference to the accompanying drawing which is a diagrammatic perspective view of a brush according to the invention.

In the preferred form of the invention a brush 1 comprises a frame 2 supporting a number of flexible straps 3 which straps 3 may comprise for example tufted or otherwise embossed straps. The straps 3 hang substantially vertically and there may be and preferably are several rows of straps 3 affixed to bars or cross members 4 of the frame 2. There may be any desirable number of rows and any desirable number of straps 3 in a row, the figure shows five rows of four straps but this arrangement is illustrative only and in general more straps per row would be provided.

Oscillatory means are provided to cause the frame 2 to undergo a reciprocal or to and fro motion in the direction in which a vehicle (not shown) moving underneath the brush will pass. The oscillatory means may include a plurality of arms pivoted at one end to the frame and pivoted at the other end to a fixed member such that by applying a pulse to one or more of the arms the frame will move backwards and forwards in a motion as above described. A pulse member is provided to provide the pulse and the pulse may comprise a connecting lever 6 which applies a pulse to a driving arm 5, the connecting lever 6 being provided between the arm 5 and a crank formed by wheel 7 or crank rotated by a suitable motor 8 having the lever 6 fixed to a non-central point thereof. The crank is thus adapted to rotate to provide a reciprocating or to and from motion. The driven arm 5 includes a pivot 9 therein and the connecting lever 6 may be connected to the pivot point 9 or adajcent thereto.

Further arms 10 are provided to support the frame 10 pivoted to the frame and to a supporting structure. If desired the other arm 10 forming a front or rear pair with the arm 5 may also be pivoted and driven for example by providing a conecting rod (not shwn) between the two arms which connecting rod is driven by the arm 6.

Weights may be provided on the frame such that any variation in weight of the straps, for example, by water being absorbed therein will not cause a substantial change in total weight of the brush. The weights are shown representatively by box 11 in the figure.

The crank is adapted to rotate such that the to and fro motion of the connecting arm is substantially the same as the harmonic frequency of the frame when suspended as above described.

The use of the invention in the preferred form is as follows:

A vehicle (not shown) for example a car, passes under the brush and a to and fro motion is imparted to the brush by causing the crank to push the connecting arm 6. The connecting arm 6 pushes on the pivot 9 which is displaced so that the frame will follow the displaced pivot to begin the oscillatory motion. The oscillatory motion will then be increased by reciprocating movement of the arm so that the straps 3 are moved backwards and forwards over the vehicle to be washed.

Thus it can be seen that a brush is provided which is simple to construct and operate and in which a substantially large displacement may be achieved. Displacement of up to, for example, about 2 feet may be achieved which is desirable to effect a satisfactory cleaning motion to a vehicle being washed. It is a further advantage of the invention that because the frame is oscillating at the or nearly at the harmonic frequency thereof shock to the building or the like from which the frame is supported is reduced to a minimum.

I claim:

1. A brush comprising:
   a frame member, a plurality of flexible straps fixed to said frame member and adapted to hang in a substantially vertical direction from said frame member, at least one arm pivoted to said frame member, said arm pivotally connected to a fixed member, said arm further including a pivot joint therein, and a pulse member for imparting a reciprocating motion to said at least one arm about said pivotal connection to said fixed member, said pulse member applying a force to said pivot joint on said arm between said fixed member pivot and said frame member pivot so that said frame member moves in a reciprocal fashion.

2. A brush as claimed in claim 1 wherein said pulse member comprises a connecting arm on a crank, said crank being adapted to be rotated such as to impart a reciprocating motion to said connecting arm.

3. A brush as claimed in claim 1 wherein additional weight is provided on said frame member such that variations in the weight of said straps does not substantially affect the total weight of the brush.

4. A brush as claimed in claim 1 wherein said frame member is substantially rectangular and said brush includes at least two arms, one of said arms being affixed adjacent the corner of said frame member, at least one of said arms having a pivot joint therein.

5. A brush as claimed in claim 4 wherein additional weight is provided on said frame member, said additional weight is adjusted such that said frame member moves at or near a harmonic frequency of a pendulum formed by said frame member and arms.

* * * * *